United States Patent
Elliott et al.

(10) Patent No.: US 8,668,214 B2
(45) Date of Patent: Mar. 11, 2014

(54) MOUNTING ARRANGEMENT FOR A V-ROD IN A VEHICLE SUSPENSION

(75) Inventors: Matt T. Elliott, Palmyra, PA (US); Mark Winders, Hagerstown, MD (US)

(73) Assignee: Mack Trucks, Inc., Greensboro, NC (US)

( * ) Notice: Subject to any disclaimer, the term of this patent is extended or adjusted under 35 U.S.C. 154(b) by 0 days.

(21) Appl. No.: 13/127,578

(22) PCT Filed: Nov. 5, 2008

(86) PCT No.: PCT/US2008/012493
§ 371 (c)(1),
(2), (4) Date: May 4, 2011

(87) PCT Pub. No.: WO2010/053466
PCT Pub. Date: May 14, 2010

(65) Prior Publication Data
US 2011/0210527 A1    Sep. 1, 2011

(51) Int. Cl.
*B60K 17/00* (2006.01)
*B60G 9/02* (2006.01)

(52) U.S. Cl.
USPC ............... 280/124.156; 180/352; 180/354; 180/360; 180/378; 280/124.116

(58) Field of Classification Search
USPC ......... 180/349, 352–354, 359, 360, 375, 377, 180/378, 382; 248/288.31; 280/124.106, 280/124.107, 124.11, 124.116, 124.156; 403/76, 77, 122; 74/607; 301/124.1, 301/137
IPC ........................................................ B60G 9/00
See application file for complete search history.

(56) References Cited

U.S. PATENT DOCUMENTS

| | | | | |
|---|---|---|---|---|
| 1,987,897 A | * | 1/1935 | Fawick | 74/473.3 |
| 2,300,844 A | * | 11/1942 | Olley | 180/349 |
| 3,157,242 A | * | 11/1964 | Kozicki | 280/124.156 |
| 3,768,829 A | * | 10/1973 | Colovas et al. | 280/124.179 |
| 3,930,421 A | * | 1/1976 | Geis, Jr. | 74/607 |
| 5,320,192 A | * | 6/1994 | Hayashida et al. | 180/414 |
| 5,649,719 A | | 7/1997 | Wallace et al. | |
| 5,711,544 A | * | 1/1998 | Buhl | 280/124.116 |
| 5,855,447 A | * | 1/1999 | Nemoto | 403/122 |
| 6,109,630 A | * | 8/2000 | Dazy et al. | 280/124.11 |
| 6,439,588 B1 | | 8/2002 | Svensson | |

(Continued)

FOREIGN PATENT DOCUMENTS

| | | | |
|---|---|---|---|
| WO | 2005080101 A1 | | 9/2005 |
| WO | WO 2006057585 A1 | * | 6/2006 |
| WO | WO 2008022620 A1 | * | 2/2008 |

OTHER PUBLICATIONS

IPRP for corresponding International Application PCT/US2008/012493.

*Primary Examiner* — Nicole Verley
*Assistant Examiner* — Laura Freedman
(74) *Attorney, Agent, or Firm* — Michael Pruden; Martin Farrell

(57) ABSTRACT

A mounting arrangement for a V-rod in a vehicle suspension includes an axle housing having a mounting cavity formed thereon and a joint member installed in the mounting cavity so that a joint coupling extends outward from the axle housing. The joint member may include a ball joint mounted on a post mountable in the mounting cavity. The mounting cavity may be formed in a boss provided on the axle housing.

6 Claims, 4 Drawing Sheets

(56) References Cited

U.S. PATENT DOCUMENTS

| | | | |
|---|---|---|---|
| 6,863,289 B2 * | 3/2005 | Buhl et al. | 280/124.111 |
| 6,962,358 B2 | 11/2005 | Bjorkgard | |
| 7,221,265 B2 | 5/2007 | Bjorkgard | |
| 7,306,211 B2 * | 12/2007 | Bjorkgard | 267/293 |
| 7,934,579 B2 * | 5/2011 | Bowers | 180/352 |
| 2007/0183841 A1 * | 8/2007 | Kunze et al. | 403/131 |
| 2009/0134593 A1 * | 5/2009 | Angerfors et al. | 280/124.133 |
| 2011/0123259 A1 * | 5/2011 | Brunneke et al. | 403/119 |
| 2012/0070224 A1 * | 3/2012 | Losche et al. | 403/227 |
| 2012/0200056 A1 * | 8/2012 | Rager et al. | 280/124.106 |

\* cited by examiner

US 8,668,214 B2

MOUNTING ARRANGEMENT FOR A V-ROD IN A VEHICLE SUSPENSION

FIELD OF THE INVENTION

The invention relates to vehicle suspensions, and more particularly, to suspensions including V-rods, that is, V-shaped structures connected between the vehicle frame and axle.

BACKGROUND AND SUMMARY

In vehicle suspensions, particularly those with air springs, it is known to use V-rods (also known as V-stays and V-bars) mounted between the frame and the axle to stabilize the axle in the lateral and fore-and-aft directions, while allowing vertical travel. A prior arrangement for mounting the V-rod to the axle, as disclosed in U.S. Pat. No. 6,439,588 to Svensson, includes a plate structure mounted with four bolts on the axle housing. The plate supports a joint member to which the point end or vertex of the V-rod is attached.

When the axle is a drive axle housing, the plate is typically mounted to the differential carrier, that is, the portion of the axle housing containing the gearing that distributes driving torque from the drive shaft to the wheels.

The arrangement of a mounting plate to the axle housing or differential carrier to support a V-rod presents difficulties. The mounting plate is a separate part, increasing weight and cost to the assembly. In addition, the mounting plate positions the V-rod joint at a height relative to the frame that may interfere with vertical suspension travel.

The invention overcomes these problems in the art with a mounting arrangement for a V-rod that includes a joint member mounted directly to the axle housing in a cavity formed therein.

According to the invention, a mounting arrangement for a V-rod in a vehicle suspension includes an axle housing having a mounting cavity formed thereon and a joint member installed in the mounting cavity so that a joint coupling extends outward from the axle housing.

According to an embodiment of the invention, the joint member comprises a post or stud installable in the mounting cavity and a joint coupling mounted on the post.

According to the invention, the mounting cavity is formed with a threaded lower part and an unthreaded upper part, the upper part being wider than the lower part, and the post includes a first threaded portion and a second unthreaded portion or pilot, the pilot being wider than the first threaded portion. The second portion of the post and the upper part of the mounting cavity are sized for an interference fit. Thus, the threaded portion of the post and the threaded part of the cavity align and draw the post into the cavity to engage the pilot and upper cavity part.

According to an embodiment, the cavity is formed on an upper surface of the axle housing. If a differential carrier is part of the axle, the cavity is formed on an upper surface of the differential carrier.

According to one embodiment, the joint member is a joint ball mounted on the post.

Alternatively, the joint member is a socket member to receive a ball joint of a V-rod.

In yet another alternative, the joint member is a bracket to receive a bushing member of a V-rod.

BRIEF DESCRIPTION OF THE DRAWINGS

The invention will be better understood by reference to the following detailed description read in conjunction with the appended drawings, in which.

DETAILED DESCRIPTION

Figure 1:
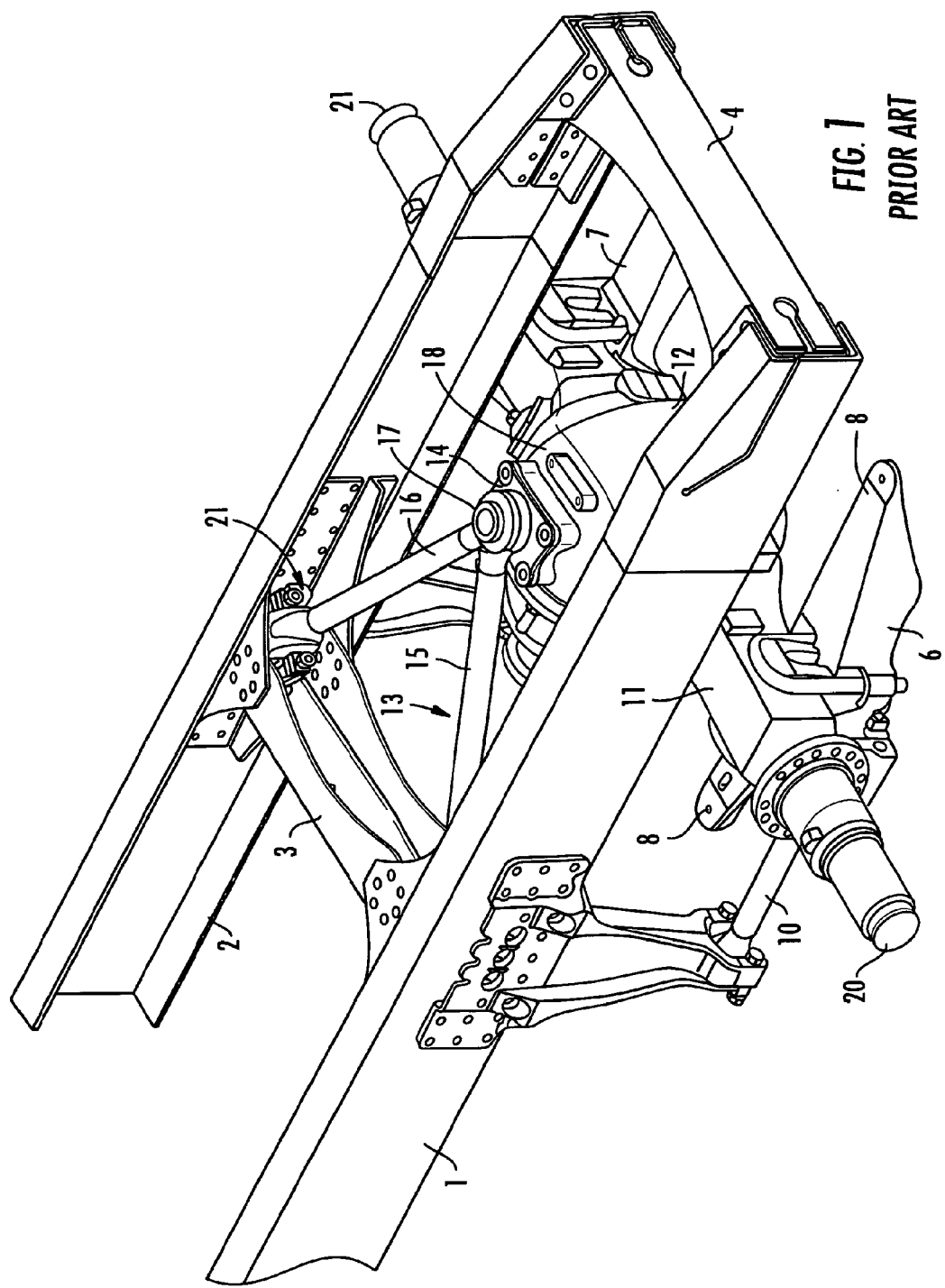
FIG. 1 is a perspective view of a truck frame and axle showing a V-rod attached between the frame and axle according to the prior art.

FIG. 1 is a perspective view of a rear end portion of a truck frame illustrating a V-rod connection of the prior art. The truck frame has side rails 1 and 2 joined by a cross members 3 and 4. An axle 11 is connected to the frame to extend laterally relative to the frame rails 1, 2 by a suspension apparatus including control arms 10 and support arms 6, 7. The support arms 6, 7 include seats 8 for air springs (not illustrated) which may be disposed between the support arms 6, 7 and frame rails 1, 2. The suspension apparatus is not fully illustrated as air suspensions are familiar to those skilled in the art and many examples are available. The invention, while particularly suitable for air suspensions, is not limited to any particular air suspension, and may be used for other types of suspensions as well.

A single axle 11 is shown in FIG. 1 for simplicity; of course, a vehicle rear axle set up may have two or three axles.

The axle 11 includes an axle housing 12 which houses the gearing that receives driving torque from the drive shaft (not illustrated) and distributes it to the wheel spindles 20, 21 for driving the wheels. A V-rod 13 is formed by two legs 15, 16 joined to form a vertex 17. The V-rod 13 is connected at the vertex 17 to the axle housing 12 and by the legs to the frame rails 1, 2. As is known, a V-rod provides lateral and longitudinal stability to the axle.

The vertex 17 of the V-rod is attached to a plate 14 mounted to a differential carrier 18 itself mounted on the axle housing 12. The arms 15, 16 of the V-rod are attached by brackets 21 (one bracket is visible) to the frame rails 1, 2.

Figure 2:
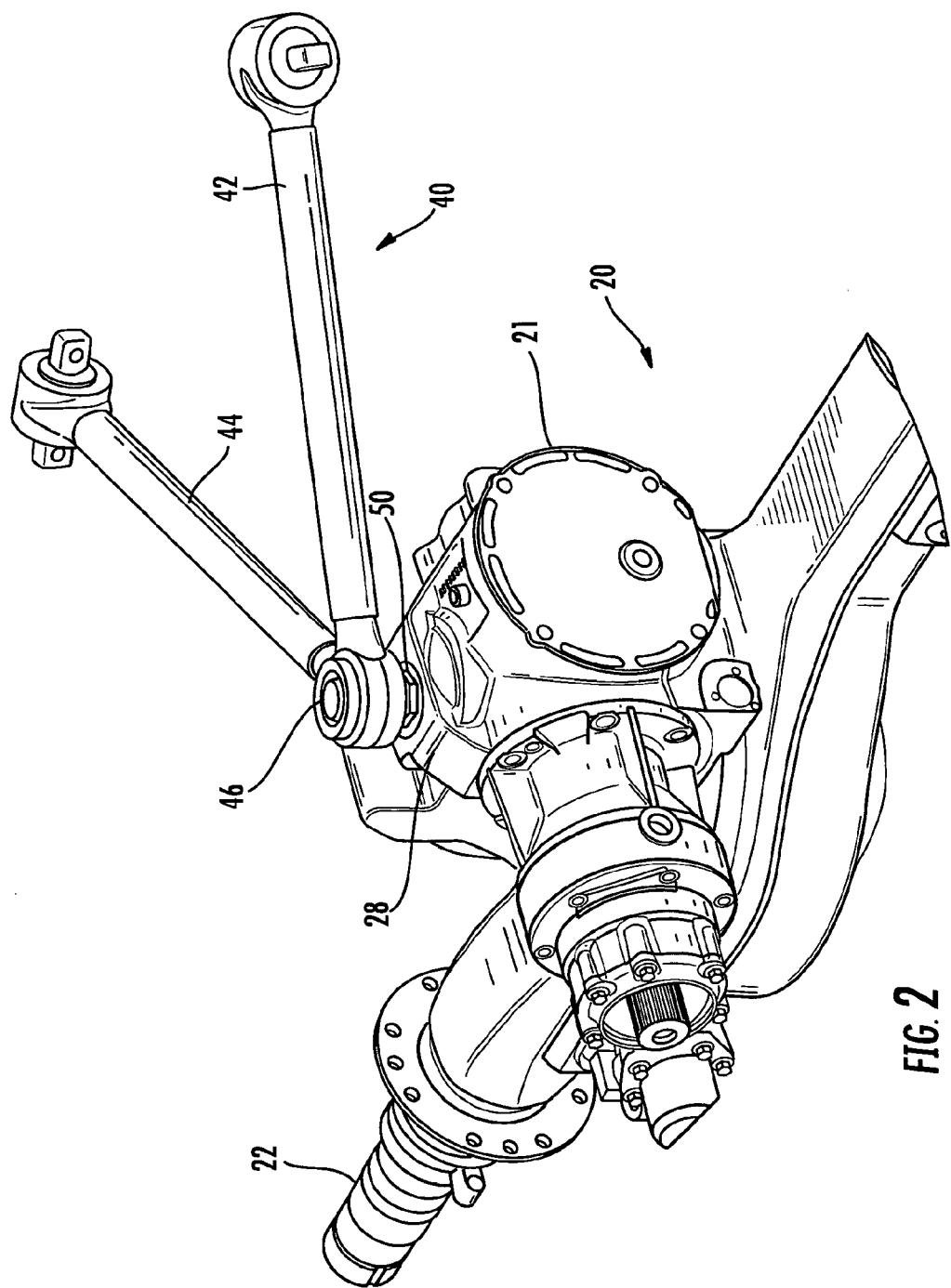
FIG. 2 is a perspective view of an axle housing with a V-rod mounting structure in accordance with an embodiment of the invention.

FIG. 2 shows in perspective view a mounting arrangement for the V-rod to the axle housing 20 in accordance with an embodiment of the invention. In FIG. 2, the axle housing 20 includes a differential carrier 21 mounted to an upper side of the axle housing. The axle housing 20 terminates with spindles 22 (only one is shown, the opposite end being sectioned) to support the wheels (not shown in this view). According to the invention, a joint member 50 for the V-rod is mounted directly to the axle housing 20, which, in the illustrated embodiment, is directly to the carrier 21. The carrier 21 includes a boss or protrusion 28 formed on an outer surface to accommodate a mounting cavity for the joint member 50. The boss and cavity may be provided on an upper surface as shown in FIG. 2.

Figure 3:
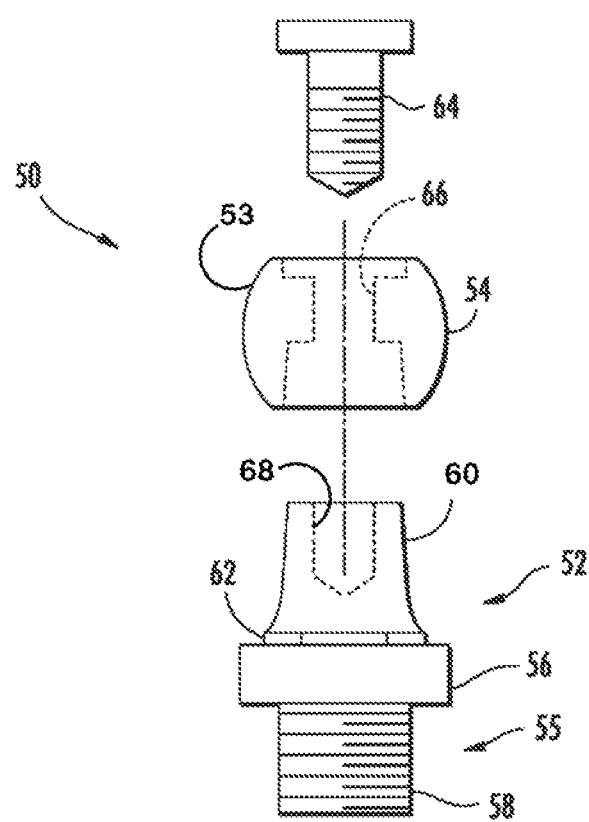
FIG. 3 is an exploded view of an embodiment of a joint member.

FIG. 3 is an exploded view of a joint member 50 in accordance with the invention. The joint member 50 includes a post 52 and a joint coupling 53, such as a joint ball 54. The post 52 includes a lower portion 55 having a pilot 56 and a threaded shaft 58. The pilot 56 is wider than the threaded shaft 58, that is, has a diameter greater than the diameter of the threaded shaft.

An upper portion or neck 60 of the post 52 supports the joint ball 54. The post 52 also includes a hex shaped collar 62 which allows the post to be rotated by a tool for installing in the boss 28, as described below. A bolt 64 inserted through a hole 66 in the joint ball 54 mates with a threaded hole 68 in the neck 60 to secure the joint ball to the post 52.

Figure 4:
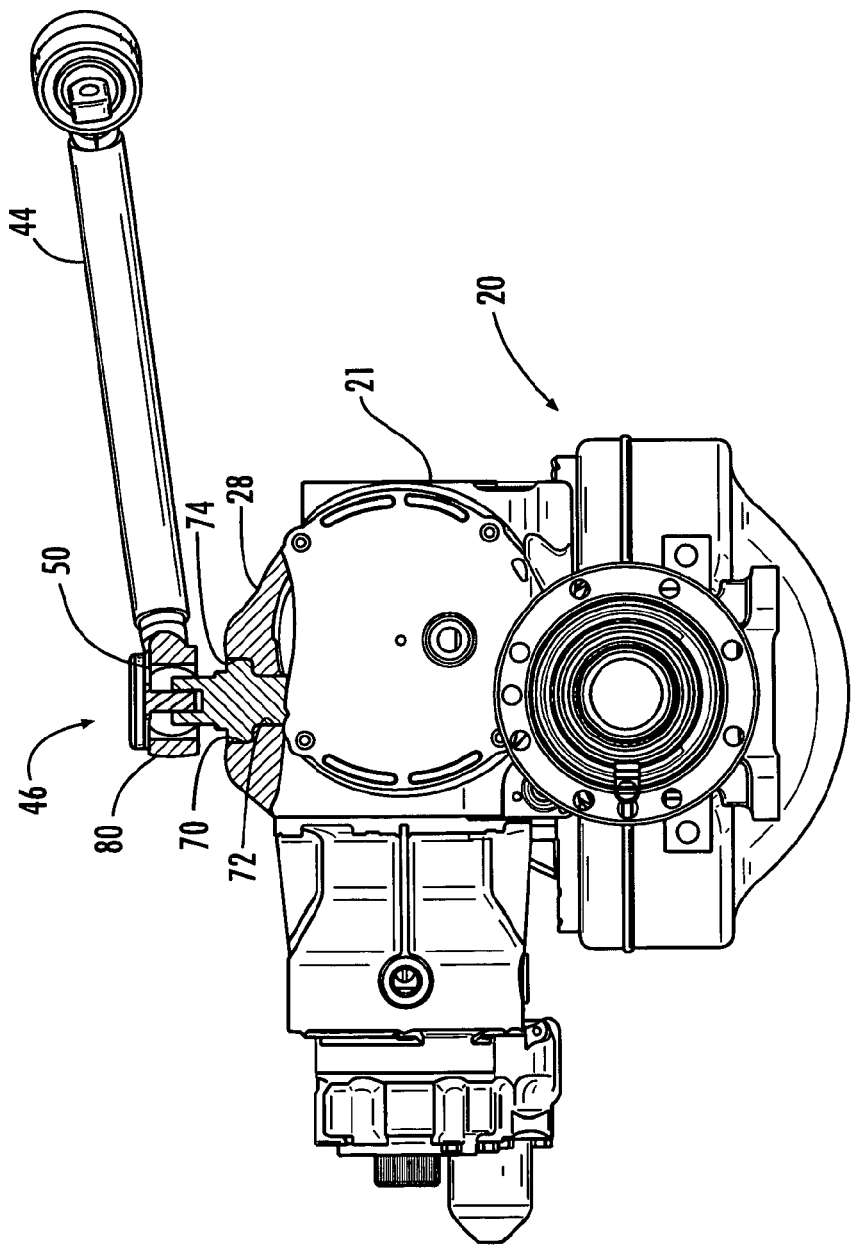
FIG. 4 is a section view of the axle housing of FIG. 2 showing internal structure of a mounting cavity with a joint member according to the invention installed therein.

FIG. 4 shows the mounting arrangement of the invention in section view. The carrier 21 boss 28 includes a mounting cavity 70 formed as a stepped hole having a threaded lower part 72 and a relatively wider, unthreaded upper part 74. The lower part 72 is sized and the threads are formed to mate with the threaded shaft 58 of the post 52. The upper part 74 is sized to have a diameter slightly less than a diameter of the pilot 56 to provide an interference fit between the upper part 74 and pilot 56. As the shaft 52 is screwed into the mounting cavity 70, the pilot 56 is drawn into and pressed into the upper part 74.

As shown in FIG. 4, the V-rod (one arm 44 being shown) is mounted to the joint ball 54 by a socket 80 carried on the vertex 46 of the V-rod.

Alternatively, a socket can be mounted to the post and the joint ball mounted on the V-rod.

According to yet another alternative, a bracket can be formed or mounted on the shaft to receive a bushing assembly mounted on the V-rod.

The invention has been described in terms of preferred principles, structure and embodiments; however, those skilled in the art will understand that substitutions may be made of components described here without departing from the scope of the invention as recited in the following claims.

What is claimed is:

1. A mounting arrangement for a V-rod in a vehicle suspension, comprising:
    an axle housing having a mounting cavity formed thereon, wherein the mounting cavity is provided with a threaded lower part and an unthreaded upper part, the upper part being wider than the lower part;
    a ball joint post installed in the mounting cavity so that a joint coupling extends outward from the axle housing, wherein the ball joint post includes a threaded end portion and an unthreaded portion, the unthreaded portion being wider than the threaded portion, the threaded portion being engageable in the threaded lower part of the mounting cavity; and
    a bolt that secures the joint coupling to the ball joint post.

2. The mounting arrangement as recited in claim 1, wherein:
    the unthreaded portion of the ball joint post and the upper part of the mounting cavity are sized for an interference fit.

3. The mounting arrangement as recited in claim 1, wherein:
    the joint coupling is a joint ball mounted on the post.

4. The mounting arrangement as recited in claim 1, wherein:
    the cavity is formed on an upper surface of the axle housing.

5. The mounting arrangement as recited in claim 1, wherein:
    the axle housing further comprises a differential carrier, and the cavity is formed on an upper surface of the differential carrier.

6. The mounting arrangement as recited in claim 5, wherein:
    the differential carrier comprises a boss to accommodate the cavity.

* * * * *